(12) United States Patent
Kasugai

(10) Patent No.: US 6,172,967 B1
(45) Date of Patent: Jan. 9, 2001

(54) SYSTEM AND METHOD FOR SERVICING COMMUNICATIONS BETWEEN BASE STATION AND PLURAL MOBILE STATIONS

(75) Inventor: Teruaki Kasugai, Kanagawa (JP)

(73) Assignee: NEC Corporation, Tokyo (JP)

( * ) Notice: Under 35 U.S.C. 154(b), the term of this patent shall be extended for 0 days.

(21) Appl. No.: 08/907,131

(22) Filed: Aug. 6, 1997

(30) Foreign Application Priority Data

Aug. 9, 1996 (JP) ................................. 8-211716

(51) Int. Cl.[7] ................................. H04B 7/212
(52) U.S. Cl. .................... 370/321; 370/337; 370/349; 370/350
(58) Field of Search .................... 370/321, 337, 370/347, 349, 350, 344

(56) References Cited

U.S. PATENT DOCUMENTS 5,121,391 * 6/1992 Paneth et al. .................... 370/95.1
5,274,841 * 12/1993 Natarajan et al. .................... 455/33.4
5,548,816 * 8/1996 DeVaney .................... 455/53.1
5,671,219 * 9/1997 Jensen et al. .................... 370/280

FOREIGN PATENT DOCUMENTS 63-114498   5/1988  (JP).
1-276935   11/1989  (JP).

* cited by examiner

*Primary Examiner*—Hassan Kizou
*Assistant Examiner*—Mitchell Slavitt
(74) *Attorney, Agent, or Firm*—Ostrolenk, Faber, Gerb & Soffen, LLP

(57) ABSTRACT

A method for servicing communications between a base station and plural mobile stations which are linked by a radio line in which plural communication channels are set, comprising the steps of setting an identifier indicating a mobile station in slot units corresponding to each of the plural communication channels, and communicating with plural mobile stations in the same communication channel.

10 Claims, 4 Drawing Sheets

RADIO DOWN-STREAM SIGNAL FORMAT

CABLE DOWN-STREAM SIGNAL FORMAT

RADIO UP-STREAM SIGNAL FORMAT

CABLE UP-STREAM SIGNAL FORMAT

CABLE DATA

RADIO CARRIER 1

SYSTEM AND METHOD FOR SERVICING COMMUNICATIONS BETWEEN BASE STATION AND PLURAL MOBILE STATIONS

BACKGROUND OF THE INVENTION

The present invention relates to a system and method for servicing communications between a base station and plural mobile stations in mobile communications such as automobile radio communications.

In a conventional mobile communication system, frequency division multiple access (abbreviated to FDMA) has been used (refer to JP-A-114498/1988). According to that method, a base station branch-outputs a receive carrier signal from a current data collecting mobile station to the next mobile station according to one-to-N polling system. Mobile stations specified by the base station for data collection mutually and sequentially monitor the carrier signal and then start to transmit data to the base station when the off-state of the carrier signal is detected.

A method of adding retransmission request information when transmission data in a base station exceeds a specified length and then requesting the remaining data transmission by means of the base station after a completion of polling operation has been used as a polling control method in a mobile communication system (refer to JP-A-276935/1989).

On the other hand, a communication system is known that uses time division multiplex access (hereinafter, often referred to as TDMA) to transmit data from a base station to mobile stations (hereinafter, often referred to as downstream), and time division multiple access to transmit data from a mobile station to the base station (hereinafter often referred to as up-stream).

However, one communication channel corresponds to one mobile station in the conventional communication method. Hence, there has been the disadvantage that the number of stations per communication channel cannot be increased, so that the transmission efficiency cannot be improved.

SUMMARY OF THE INVENTION

The objective of the present invention is to solve the above-mentioned problems. The objective of the invention is to provide a method for servicing radio communications between a base station and plural mobile stations in mobile communications, which can improve transmission efficiency.

Another objective of the present invention is to provide a system for servicing radio communications between a base station and plural mobile stations in mobile communications, which can improve transmission efficiency.

The objective of the present invention is achieved by the method of servicing communications between a base station and plural mobile stations which are linked by a radio line in which plural communication channels are set, comprising the steps of setting an identifier indicating a mobile station in slot units corresponding to each of the plural communication channels, and communicating with plural mobile stations in the same communication channel.

The method further comprises the step of performing communications between the base station and the plural mobile stations using a polling switching system.

In a system for servicing communications between a base station and plural mobile stations which are linked by a radio line in which plural communication channels are set, an identifier indicates a mobile station in slot units corresponding to each of the plural communication channels, and communications with plural mobile stations in the same communication channel is accomplished.

The base station communicates with the plural mobile stations using a polling switching system.

The radio line uses time division multiplex access to transmit information from the base station to a mobile station and uses time division multiple access to transmit information from a mobile station to the base station.

The method comprises the step of using time division multiplex access in the radio line to transmit information from the base station to a mobile station and using time division multiple access in the radio line to transmit information from a mobile station to the base station.

BRIEF DESCRIPTION OF THE DRAWINGS

This and other objects, features and advantages of the present invention will become more apparent upon a reading of the following detailed description and drawings, in which.

DESCRIPTION OF THE EMBODIMENTS

An embodiment of the present invention will be described below in detail with reference to the attached drawings.

Figure 1:
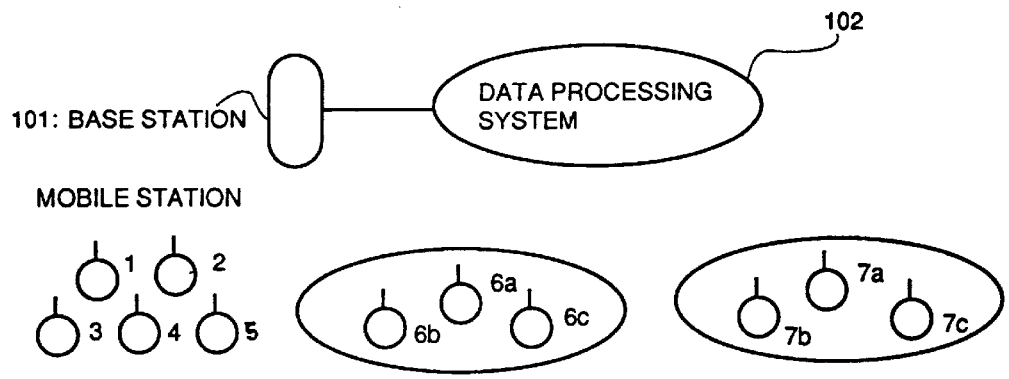
FIG. 1 is a block diagram showing the configuration of a mobile communications system according to an embodiment of the present invention.
Figure 2:
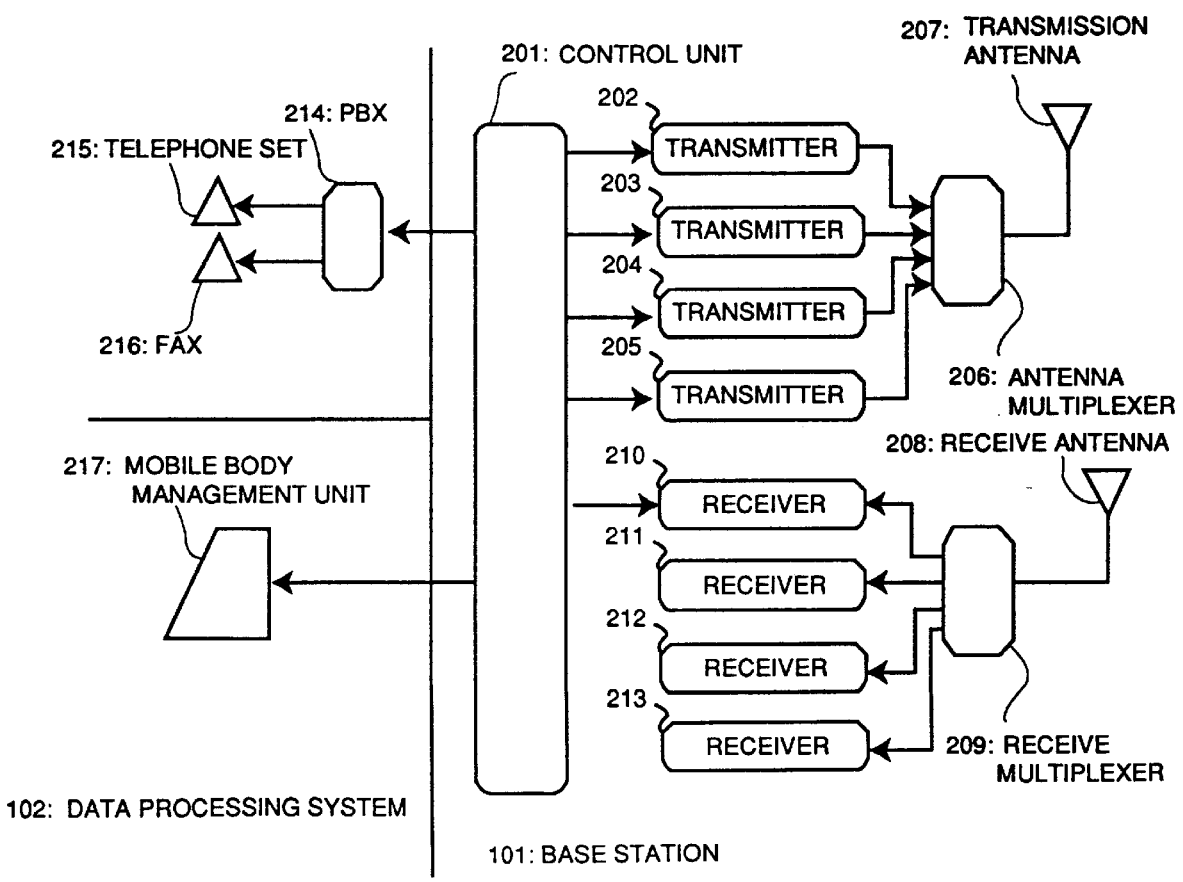
FIG. 2 is a block diagram showing the base station 101 and the data processing system 102 in FIG. 1, in an embodiment of the present invention.

FIG. 1 is the whole configuration of a mobile communication system according to an embodiment of the present invention. Referring to FIG. 1, a base station 101 is connected to a cable data processing system 102. Mobile stations 1 to 5, 6a to 6c, and 7a to 7c are linked to the base station 101 by means of a radio line handling plural carriers. FIG. 2 is a block diagram showing the base station 101 and the data processing system 102. The base station 101 includes transmitters 202 to 205 and receivers 210 to 213 connected via a control unit 201 and handles four pairs of radio carriers. The antenna multiplexer 206 synthesizes transmit radio carriers of four systems and radiates out into space from the transmit antenna 207.

The receive antenna 208 receives the radio carrier from a moving object. The receive distributor 209 distributes the received carrier to receivers 210 to 213. The moving object management unit 217 which grasps and manages the location of moving objects as well as the PBX 214 in the data processing system 102 are connected to the control unit 201. A telephone set 215 and a FAX machine 216 are connected to the PBX 214.

Figure 3:
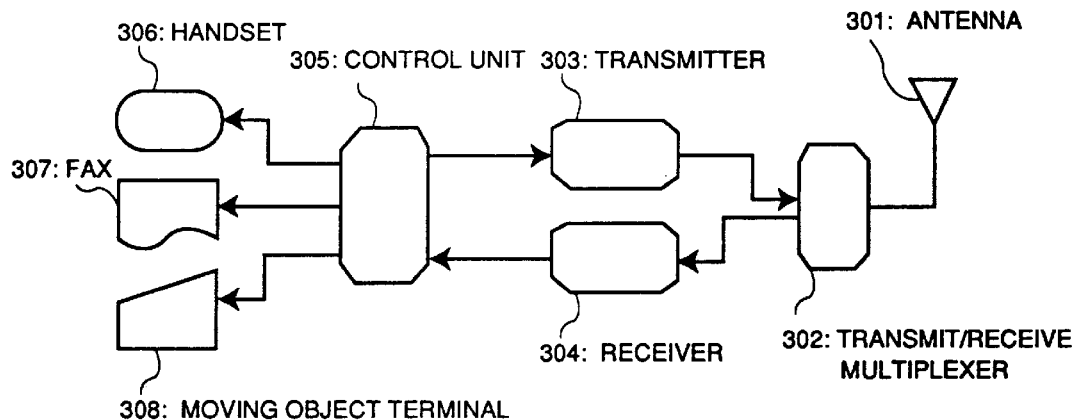
FIG. 3 is a block diagram showing the configuration of a mobile station shown in FIG. 1.

FIG. 3 is a block diagram showing the configuration of each of mobile stations 1 to 5, 6a to 6c, and 7a to 7c. The antenna 301 is connected to the transmitter 303 and the receiver 304 via the transmit/receive multiplexer 302 and is used for transmission and reception. The control unit 305 is connected to the handset 306, the FAX machine 307, the moving object terminal 308, the transmitter 303, and the receiver 304 and controls exchanges of various signals.

Figure 4A:
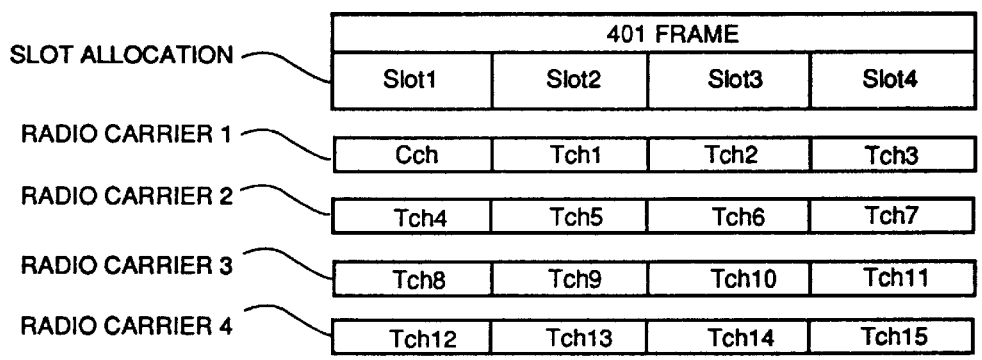
FIG. 4A is a diagram showing the channel configuration of a radio line.
Figure 4B:
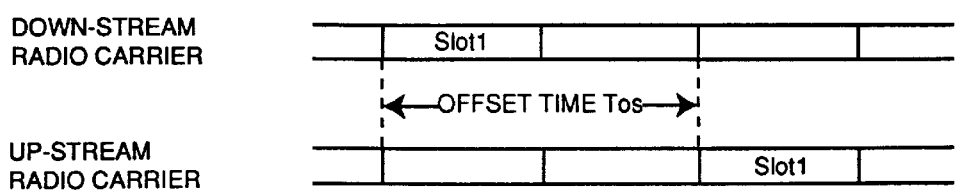
FIG. 4B is a diagram showing the slot allocation of a radio trunk.

FIG. 4A shows the channel configurations of radio carriers 1 to 4. According to the embodiment, the channel configuration is formed of four radio channel pairs each including up-stream and down-stream. The channel configuration for transmission is the same as that for reception. However, as shown in FIG. 4B, the slot 1 for a up-stream radio carrier lags behind the slot 1 of a downstream radio carrier by only the offset time Tos. Each of the radio carriers 1 to 4 is formed of a series of frames 401 each including slots 1 to 4. The common control channel Cch as well as the communication channels Tch1 to Tch3 are allocated to the radio carrier 1. The communication channels Tch4 to Tch7 are allocated to the radio carrier 2. The communication channels Tch8 to Tch11 are allocated to the radio carrier 3. The communication channels Tch12 to Tch15 are allocated to the radio carrier 4.

Figure 5A:
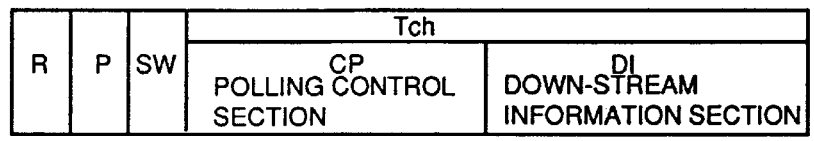
FIGS. 5A to 5D are diagram showing signal formats each in one slot in a cable line and signal formats each in one slot in a radio line.
Figure 5B:
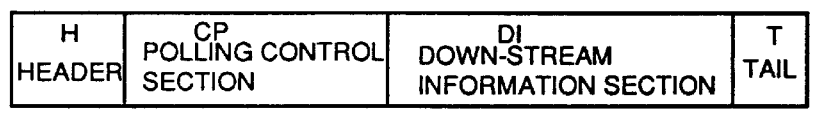
Figure 5C:
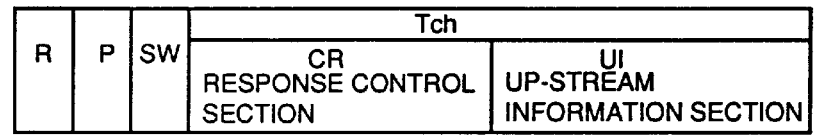
Figure 5D:

FIGS. 5A to 5D are diagram showing signal formats. FIG. 5A is a diagram showing the format of a radio down-stream signal transmitted from the base station 101 in FIG. 1 to the mobile stations 1 to 5, 6a to 6c, and 7a to 7c. FIG. 5B is a diagram showing the format of a cable down-stream signal transmitted from the data processing system 102 to the base stations 101. FIG. 5C is a diagram showing the format of a radio up-stream signal transmitted from the mobile stations 1 to 5, 6a to 6c, and 7a to 7c to the base station 101. FIG. 5D is a diagram showing the format of a cable up-stream signal transmitted from the base station 101 to the data processing system 102.

In FIGS. 5A–5D, symbol R represents transient response guard time; P represents preamble; SW represents synchronous word; Tch represents communication channel; CP represents polling control section; DI represents down-stream information section; H represents header; T represents tail; CR represents response control section; and UI represents up-stream information section.

Next, the operation of the present embodiment will be described by referring to an example case where the moving object management unit 217 (FIG. 2) collects data from the mobile stations 6a, 6b, and 6c under polling control.

Figure 6A:
FIGS. 6A to 6D are diagram showing states of signal communications between the base station 101 and mobile stations 6a to 6c and 2.
Figure 6B:
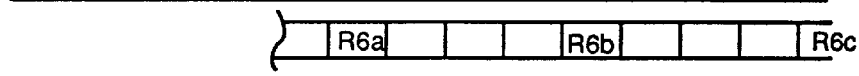

As shown in FIG. 6A, the moving object management unit 217 sequentially outputs to the control unit 201 the signal P6a which is to be transmitted to the mobile station 6a, the signal P6b which is to be transmitted to the mobile station 6b, and the signal P6c transmitted to the mobile station 6c. The signals P6a, P6b, and P6c have the format illustrated in FIG. 5B. An identifier indicating the mobile station 6a is written into the polling control section CP of the signal P6a. An identifier indicating the mobile station 6b is written into the polling control section CP of the signal P6b. An identifier indicating the mobile station 6c is written into the polling control section CP of the signal P6c.

Figure 6C:
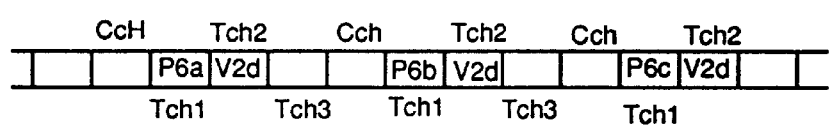

The control unit 201 outputs the signals P6a, P6b, and P6c from the moving object management unit 217 to the transmitter 202. The transmitter 202, as shown in FIG. 6C, modulates the radio carrier 1 with the signals P6a, P6b, and P6c with the timing of the communication channel Tch1 and then transmits the modulated signals sequentially.

Figure 6D:
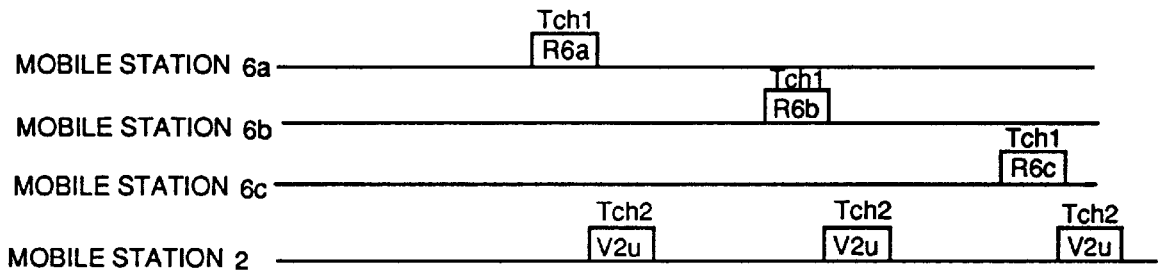

On the other hand, when each of the mobile stations 6a, 6b, and 6c are in a wait time, the mode is in the common control channel Cch of the radio carrier 1 shown in FIG. 4. After a predetermined connecting process, the mode changes to the communication channel Tch1 of the radio channel 1. When detecting the signal P6a sent to itself, as shown in FIG. 6D, the mobile station 6a transmits the up-stream transmission signal R6a to the base station with the timing of the up-stream transmission communication channel Tch1 after a period of the offset time Tos (shown in FIG. 4). In a similar manner, when detecting the signal P6b sent to itself, the mobile station 6b transmits the answer signal R6b to the base station with the timing of the upstream transmission communication channel Tch1 after a period of the offset time Tos. When detecting the signal P6c sent to itself, the mobile station 6c transmits the up-stream transmission signal R6c to the base station with the timing of the up-stream transmission communication channel Tch1 after a period of the offset time Tos (shown in FIG. 4B).

As described above, according to the present embodiment, the same communication channel Tch 1 is used for three mobile stations 6a, 6b, and 6c. This feature allows data with a small amount of information and with high frequency to be transmitted at high speed and with high efficiency.

Next, explanation will be made below on the case where the base station 101 performs voice communications to the mobile station 2. In this case, the mobile station 2 migrates to the communication channel Tch2 from the radio carrier common control channel Cch via a predetermined connection control. The down-stream voice signal V2d from the telephone set 215, as shown in FIG. 6C, is carried and transmitted on the radio carrier 1 from the base station 101 with the timing of the communication channel Tch2. When detecting the signal V2d, the mobile station 2 transmits the up-stream transmission signal V2u to the base station, with the timing of the up-stream transmission communication channel Tch2 after a period of the offset time Tos (shown in FIG. 4) (refer to FIG. 6D).

As understood above, an embodiment of the present invention has been described in detail with reference to the drawings. However, it should be noted that the present invention is not limited only to the above-mentioned embodiments. Design changes may be made without departing from the scope of the present invention.

As described above, the present invention relates to the communication method between the base station and mobile stations which are linked by radio lines in which plural communication channels are set. A identifier indicating a mobile station in slot units corresponding to each communication channel, so that the base station can communicate with plural mobile stations via the same channel. For that reason, the high-speed polling control can be performed, thus improving the transmission efficiency. As a result, the accommodated traffic per frequency spectrum and the number of accommodated mobile stations can be increased. Particularly, channels can be effectively used in the moving object management handling a small amount of information with high-frequency.

The entire disclosure of Japanese Patent: Application No. 8-211716 filed on Aug. 9, 1996 including specification, claims, drawing and summary are incorporated herein by reference in its entirety.

What is claimed is:

1. A method for servicing communications between a base station and a plurality of mobile stations which are linked by at least one radio carrier, said at least one radio carrier being divided into a plurality of slot units, each of said slot units respectively corresponding to one of a plurality of communication channels, whereby said at least one radio carrier contains said plurality of communication channels and each of said plurality of communication channels is comprised of a subset of said plurality of said slot units, the method comprising the steps of:

setting identifiers indicating said plurality of mobile stations in slot units corresponding to one of said plurality of communication channels, each slot unit of said one communication channel containing an identifier indicating a different one of said plurality of mobile stations; and communicating with the plurality of mobile stations in said one communication channel.

2. The method of claim 1, further comprising the step of performing communications between said base station and said plurality of mobile stations using a polling switching system.

3. The method of claim 1, comprising the step of using time division multiplex access in said radio carrier to transmit information from said base station to a mobile station and using time division multiple access in said radio carrier to transmit information from a mobile station to said base station.

4. The method of claim 2, comprising the step of using time division multiplex access in said radio carrier to transmit information from said base station to a mobile station and using time division multiple access in said radio carrier to transmit information from a mobile station to said base station.

5. A communications system comprising:

a base station linked with a plurality of mobile stations by a radio carrier, said radio carrier being divided into a plurality of slot units, each of said slot units respectively corresponding to one of a plurality of communication channels, whereby said at least one radio carrier contains said plurality of communication channels and each of said plurality of communication channels is comprised of a subset of said plurality of said slot units;

a control section in said base station, said control section controlling exchange of various signals; and a moving object management unit connected to said control unit, the moving object management unit managing locations of said mobile stations;

wherein said base station communicates with said plurality of mobile stations on a single communication channel by setting an identifier indicating a mobile station in a slot unit corresponding to said single communication channel, each slot unit of said single communication channel containing an identifier indicating a different one of said plurality of mobile stations.

6. The system of claim 5, wherein said moving object management unit communicates with said plurality mobile stations using a polling switching system.

7. The system of claim 5, wherein said radio carrier uses time division multiplex access to transmit information from said base station to a mobile station and uses time division multiple access to transmit information from a mobile station to said base station.

8. The system of claim 6, wherein said radio carrier uses time division multiplex access to transmit information from said base station to a mobile station and uses time division multiple access to transmit information from a mobile station to said base station.

9. A communications system comprising:

a base station linked with a plurality of mobile stations by a radio carrier, said radio carrier being divided into a plurality of slot units, each of said slot units respectively corresponding to one of a plurality of communication channels, whereby said at least one radio carrier contains said plurality of communication channels and each of said plurality of communication channels is comprised of a subset of said plurality of said slot units, said base station communicating with said plurality of mobile stations using a polling switching system, said radio carrier using time division multiplex access to transmit information from said base station to a mobile station and using time division multiple access to transmit information from a mobile station to said base station, said base station including:

transmitters transmitting a signal to a mobile station;

an antenna multiplexer connected to said transmitters, said antenna multiplexer synthesizing plural transmission radio carriers;

a transmission antenna coupled to said antenna multiplexer and radiating said synthesized radio carriers;

a receive antenna receiving radio carriers;

a receive distributor coupled to said receive antenna and distributing radio carriers received by said receive antenna;

receivers coupled to said receive distributor and receiving a radio carrier distributed by said receive distributor;

a control unit connected to said transmitters and said receivers, said control unit controlling exchanges of various signals; and a moving object monitoring unit connected to said control unite, said moving object monitoring unit monitoring locations of said mobile stations;

wherein said base station communicates with said plurality of mobile stations on a single communication channel by setting an identifier indicating a mobile station in a slot unit corresponding to said single communication channel, each slot unit of said single communication channel containing an identifier indicating a different one of said plurality of mobile stations.

10. A communications system comprising:

a base station;

a data processing system coupled to the base station; and a plurality of mobile stations in communication with the base station;

wherein the base station communicates with the plurality of mobile stations by a radio carrier, said radio carrier being divided into a plurality of slot units, each of said slot units respectively corresponding to one of a plurality of communication channels whereby said at least one radio carrier contains said plurality of communication channels and each of said plurality of communication channels is comprised of a subset of said plurality of said slot units;

wherein said base station transmits a radio down stream signal to said plurality of mobile stations by said radio carrier, a format of the radio down stream signal including a transient response guard time, a preamble, a synchronous word, a polling control section, and a down-stream information section;

wherein said data processing system transmits a cable down stream signal to said base station, a format of said cable down stream signal including a header, a polling control section, a down-stream information section, and a tail;

wherein at least one of said mobile stations transmits a radio up stream signal to said base station, a format of said radio up stream signal including a transient response guard time, a preamble, a synchronous word, a response control section, and an up-stream information section; and wherein said base station transmits a cable up stream signal to said data processing system, a format of said cable up stream signal including a header, a response control section, an up-stream information section, and a tail.

* * * * *